(12) United States Patent
Selitser et al.

(10) Patent No.: US 7,953,100 B2
(45) Date of Patent: May 31, 2011

(54) SYSTEM AND METHOD FOR PROVIDING A PLUGGABLE ARCHITECTURE FOR STATE MANAGEMENT IN A TELECOMMUNICATION SERVICE ACCESS GATEWAY

(75) Inventors: Boris Selitser, Castro Valley, CA (US); Anders Lars-Goran Forsberg, San Francisco, CA (US); Jean Bovet, Menlo Park, CA (US)

(73) Assignee: Oracle International Corporation, Redwood Shores, CA (US)

( * ) Notice: Subject to any disclaimer, the term of this patent is extended or adjusted under 35 U.S.C. 154(b) by 332 days.

(21) Appl. No.: 12/248,729

(22) Filed: Oct. 9, 2008

(65) Prior Publication Data

US 2009/0279556 A1    Nov. 12, 2009

Related U.S. Application Data

(60) Provisional application No. 61/051,295, filed on May 7, 2008.

(51) Int. Cl.
*H04L 12/56* (2006.01)
(52) U.S. Cl. .................................. 370/401; 709/229
(58) Field of Classification Search ........................ None
See application file for complete search history.

(56) References Cited

U.S. PATENT DOCUMENTS

| | | | |
|---|---|---|---|
| 5,091,846 A | 2/1992 | Sachs et al. | |
| 5,140,681 A | 8/1992 | Uchiyama et al. | |
| 5,469,555 A | 11/1995 | Ghosh et al. | |
| 5,561,783 A | 10/1996 | Vanka | |
| 6,351,767 B1 | 2/2002 | Batchelder et al. | |
| 6,826,661 B2 * | 11/2004 | Umbehocker et al. | 711/154 |
| 6,990,526 B1 | 1/2006 | Zhu | |
| 7,788,386 B2 * | 8/2010 | Svensson | 370/401 |
| 2006/0015556 A1 * | 1/2006 | Pounds et al. | 709/206 |
| 2007/0106808 A1 * | 5/2007 | Vemula et al. | 709/230 |

OTHER PUBLICATIONS

DTS Inc., PlatinumCache 1.0 (Linux Windows), downloaded from www.plantinumcache.com/products/C4.html on Nov. 6, 2008, 5 pages.
SGI Total Performance 9100 (2Gb TP9100) Storage System User's Guide, Chapter 3. Features of the RAID Controller, downloaded from http://techpubs.sgi.com/library/tpl/cgi-bin/getdoc.cgi/linux/bks/SGI_EndUser/books/SGI9100_OG/sgi_html/ch03.html on Nov. 6, 2008, 7 pages.

* cited by examiner

*Primary Examiner* — John Pezzlo
*Assistant Examiner* — Matthew Campbell
(74) *Attorney, Agent, or Firm* — Fliesler Meyer LLP

(57) ABSTRACT

A network service access gateway is described that provides a pluggable state management architecture for storing state information. The gateway typically processes requests between entities such as external applications and subscriber mobile devices. In processing data, the gateway can implement multiple storage providers which are selected according to the data access requirements of the specific request. Each storage provider can implement a different caching or data management technique in order to provide access to the required information. Examples of the storage providers include in-memory only caches, write-through disk based storage provider, write-behind disk based storage provider and non-cached disk-based storage provider. The particular storage provider can be selected based on a configuration file and according to the traffic path associated with the request.

19 Claims, 5 Drawing Sheets

SYSTEM AND METHOD FOR PROVIDING A PLUGGABLE ARCHITECTURE FOR STATE MANAGEMENT IN A TELECOMMUNICATION SERVICE ACCESS GATEWAY

CLAIM OF PRIORITY

The present application claims the benefit of U.S. Provisional Patent Application No. 61/051,295 entitled SYSTEM AND METHOD FOR PROVIDING A PLUGGABLE ARCHITECTURE OF MULTIPLE CACHE TYPES IN A TELECOMMUNICATION SERVICE ACCESS GATEWAY, filed on May 7, 2008, which is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to state management and telecommunications and more particularly to pluggability of multiple state storage types for different types of data within a telecommunications gateway.

BACKGROUND

With the ever-increasing popularity of the World Wide Web, more and more previously unrelated technologies are becoming integrated with the enormous network of information and functionality that the internet provides. Everything from television and radio to books and encyclopedias are becoming available online, amongst a wide variety of other technologies. One such area of technology is telephony and the related telecommunications services.

Conventionally, telecommunications and network infrastructure providers have relied on often decades-old switching technology to providing routing for network traffic. Businesses and consumers, however, are driving industry transformation by demanding new converged voice, data and video services. The ability to meet these demands can often be limited by existing IT and network infrastructures that are closed, proprietary and too rigid to support these next generation services. As a result, telecommunications companies have been transitioning from traditional, circuit-switched Public Switched Telephone Networks (PSTN), the common wired telephone system used around the world to connect any one telephone to another telephone, to Voice Over Internet Protocol (VoIP) networks. VoIP technologies enable voice communication over "vanilla" IP networks, such as the public Internet. Additionally, a steady decline in voice revenues has resulted in heightened competitive pressures as carriers vie to grow data/service revenues and reduce churn through the delivery of these more sophisticated data services. Increased federal regulation, security and privacy issues, as well as newly emerging standards can further compound the pressure.

Delivering these more sophisticated data services has proved to be more difficult than first imagined. Existing IT and network infrastructures, closed proprietary network-based switching fabrics and the like have proved to be too complex and too rigid to allow the creation and deployment of new service offerings.

While the worlds of TCP/IP applications and of telephony networks continue to converge, the relationship between them has often been overly complex and difficult to manage for various organizations, as well as for consumers. In recent times, specialized telecommunication servers and various service gateways have emerged to enable simpler ways for developers to include telephony-based functionality in their software applications, as well as provide increased security and stability. Nevertheless, these specialized solutions continue to need improvements in performance generally required by network operators and demanded by their subscribers.

One such area for improvement involves the caching, storage and management of various data. As an example, because of the multiple types of information and traffic processed within such gateways, the data management techniques of the prior art may be inefficient due to their general tendency to cache/store all types of data in the same or similar manner. Improvements in such caching and storage techniques, as well as other data management practices, which account for the specific factors of telecommunications infrastructures, are desirable.

DETAILED DESCRIPTION

Figure 1:
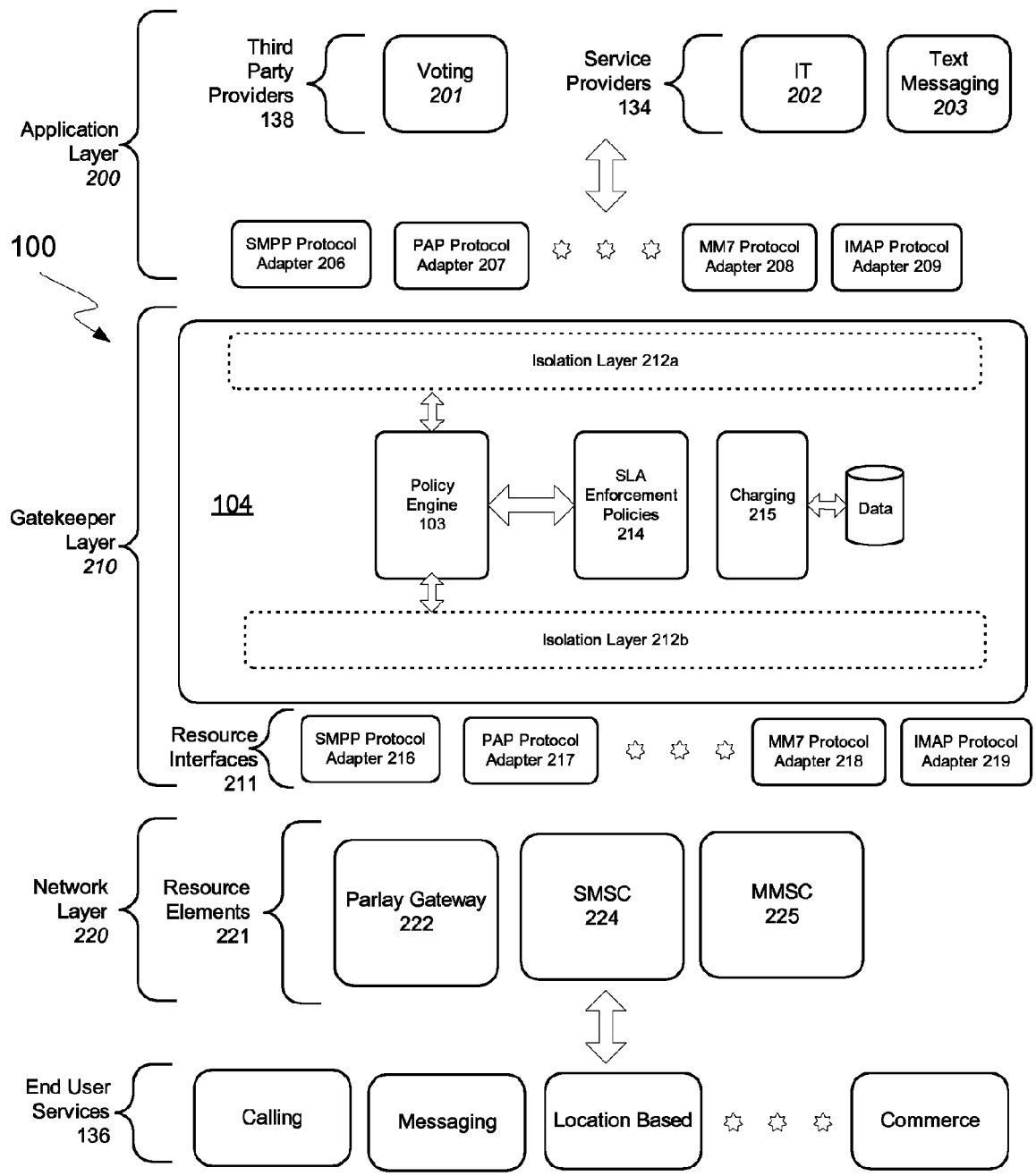
FIG. 1 is an illustration of a network gatekeeper that can be used in conjunction with the pluggable state management architecture in accordance with various embodiments.

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

Although a diagram may depict components as logically separate, such depiction is merely for illustrative purposes. It can be apparent to those skilled in the art that the components portrayed can be combined or divided into separate software, firmware and/or hardware components. For example, one or more of the embodiments described herein can be implemented in a network accessible device/appliance such as a server or a router. Furthermore, it can also be apparent to those skilled in the art that such components, regardless of how they are combined or divided, can execute on the same computing device or can be distributed among different computing devices connected by one or more networks or other suitable communication means.

In accordance with the embodiments of the invention, there are provided mechanisms and methods for providing a pluggable architecture of different state storage types within a telecommunication service access gateway. The service gateway can be an intermediary entity deployed by a telecommunications provider for managing access by various applications to the subscriber network and the various subscriber clients of the provider. During the processing of various communications between the subscribers and the service provider applications, gateways generally need to store and process various types of data. This is usually done by using direct access to the database or some other form of disk-based store. In addition, since hitting the disk-based store is generally a time consuming endeavor, in many cases subsets of data are cached at the server level for faster access and usability. Various caching techniques are often used to reduce the number of hits to the database and improve latency during data access. However, because of the different types of data and traffic typically processed by service access gateways, there may be no single existing cache that is optimally efficient for handling all the information within the gateway.

In various embodiments, a traffic path is a basic functional unit in the network service access gateway. The traffic path can consist of a service type (Short Messaging, User Location, etc.), an application-facing interface (also called a "north" interface), and a subscriber network-facing interface (also called a "south" interface). A request for service enters through one interface, is subjected to internal processing, including evaluation for policy and protocol translation, and is then sent on using the other interface. Because a single application-facing interface may be connected to multiple protocols and hardware types in the underlying telecom network, an application is communicating, finally, with a specific traffic path, and not only the north interface. In some network gateway traffic paths, request traffic travels in two directions—from the application to the underlying network and from the underlying network to the application. In other traffic paths, traffic flows in one direction only. For example, during application-initiated traffic, the application sends a request to the gateway, the request is processed, and a response of some kind is returned synchronously or asynchronously. Similarly, the communication can be initiated at the network level and be carried through the gateway to the application. In either case, when traffic flows through the traffic paths, in order to perform the internal processing (protocol translation, etc.) the gateway often reads and writes various data (e.g. protocol state information, session information, etc.). In many cases, it is advantageous to cache this data and depending on the traffic path a different caching algorithm could prove to be more efficient.

Because of the different types of data access needed within the gateway, and because of the different characteristics of the different types of state, it may be desirable to treat the storage of the state data in different ways, such as by implementing different state management algorithms and techniques depending on the type of data being processed. For example, application session state is typically mostly read because once a session is established it is often reused for many requests. As such, because session state entails "read-mostly" type of access, it is advantageous to have fast read access and it may be acceptable to have somewhat slow write access, since these transactions occur much less frequently. In one embodiment, a write-through storage provider is a good candidate for storing this type of state information. Another type of information is the messaging service traffic path state. This state data is typically written, read and removed very quickly and therefore fast access for all types of operations is desirable for this type of data. In some cases, however, the state needs to remain for very long periods of time (e.g. days, weeks, etc. such as when the receiving mobile subscriber's handset is turned off). In this case, a write-behind type of store can be the optimal container for this type of state because it provides fast in-memory access to the state while also persisting the state in a disk-based store with a write-behind type of invocation. This write-behind can be optimal for the SMS traffic path because in most cases, the message state is merely cached in memory and removed before the write-behind disk-based store call needs to be invoked, but for the infrequent occurrences when the state needs to be persisted, the write-behind invocation will take care of writing the state to the disk-based store during the next scheduled batch of writes. For other types of data, additional algorithms can be implemented as well. To summarize, while certain types of traffic paths within the gateway may perform read-mostly operations of short lived data, other types of traffic paths perform read/write operations of long lived data and yet other traffic paths carry out write-mostly or write-only operations. Accordingly, in one embodiment, depending on the data requirements of the particular traffic path, a different state management algorithm can be implemented within the gateway.

In one embodiment, a storage service is provided as a pluggable framework to support multiple storage providers plugging into the storage service of the gateway. Depending on the requirements of the traffic path, a particular storage provider can be selected for each path. In the preferred embodiment, most traffic path types can be covered by the following four categories of storage behavior:

a. In-memory Cluster Store—An In-memory Cluster Store is a cluster wide in-memory only store, preferably with redundancy support by keeping backup copies on one or more of the other servers in the cluster. As this is an in-memory store, data reads/writes are typically very fast.

b. Write Behind Store—A write behind store is a cluster wide in-memory store, preferably with redundancy support by keeping backup copies on one or more of the other servers in the cluster, and also backed by disk-based storage. Updates for the write behind store are delayed and asynchronously written in batches to the disk-based storage. This store has similar performance characteristics as the cluster cache store for data that is available in the cache, but with better availability.

c. Write Through Store—This is a cluster wide in-memory cache of a disk-based storage. Updates for the disk-based storage for write through stores are done synchronously as part of the store update operation. In general, updates to data in the store will be slow compared to the cluster cache store, but read operations will be fast if the data is available in the cache. This store offers high reliability.

d. Log Store—The log store type data updates are delayed and asynchronously written in batches to the disk-based storage, such as a database. This type of store is meant for additive batch writing of write-only data. Since this type of store is not meant for reading, updating or deleting data, it does not need to keep data in-memory after it has been written to the disk-based storage. Since this store is only meant for adding data, read performance will be poor, but optimized for add operations by doing disk-based writes in batches.

It should be noted that the store types described above are provided purely for purposes of illustration and that this disclosure should not be limited to these four types. As will be evident to one of ordinary skill in the art, other types of storage types can be implemented within the scope of the various embodiments by using the pluggable architecture of multiple state storage types.

In the preferred embodiment, the selection of the store type should be based on what kind of data will be stored, how often it is written and read and how long the data will stay in the store. In general, if the lifetime for data is short enough that having the data duplicated in memory on two servers in the cluster should provide sufficient durability, the cluster cache type would be a good selection. In other cases, a trade-off can be made between the data integrity given by transaction synchronized write-through operation and the performance given by an asynchronous write-behind. For data that just needs to be added to a disk-based store (such as a database table), and is never read, the disk-based log store is preferable, since this store type could be optimized to avoid keeping cache entries in memory that will not be read anyway. In one embodiment, the following table illustrates an example of optimizing the selections of the store type according to data access:

| Access Type | Lifetime | Store Type |
| --- | --- | --- |
| Read mostly | Short | Cluster Cache |
| Read mostly | Long | Disk-based Write-Through |
| Write mostly | Short | Cluster Cache |
| Write mostly | Long | Disk-based Write-Behind |
| Write only | Any | Disk-based Log |
| Read/Write | Short | Cluster Cache |
| Read/Write | Long | Disk-based Write-Behind |

The storage service publishes two separate contracts: one towards the extending storage providers and another towards client APIs. The storage service framework also provides classes to the storage providers to access common configuration and state of the storage service. In one embodiment, the storage provider is the module that actually manages the data. The selection of which storage provider is used is determined by using configuration files (such as "config.xml"). The details on how data is stored and accessed may differ between the storage providers and each storage provider can have its own configuration files if this is needed. The storage service framework and extension interfaces and classes used to implement a storage provider can be an internal feature within the gateway and need not be exposed to the external applications.

In various embodiments, the pluggable state management architecture just described can be implemented in a network gatekeeper application built on top of a JAVA 2 Enterprise Edition (J2EE) compliant application server. The network gatekeeper is an example of a policy driven telecommunications web services gateway that allows granular control over access to network resources from un-trusted domains. In one embodiment, the network gatekeeper can be an application deployed by a telecom provider in order to manage access to its network by the third party services that are offered to the various subscribers of the telecom provider.

As an illustration, most operators and telecommunication providers expect to drastically increase the portfolio of services offered to their customers to hundreds and even thousands of content and application offerings. While some of these services may be developed in-house (and thus be deployed on an internal network), the vast majority of such services will likely come from third party service providers and partners. This creates a need to handle the network and application integration with such third party services, as well as manage the entire ecosystem to the satisfaction of the consumers. The network gatekeeper application can provide a secure common entry point for third party applications accessing network resources both through telecom web services interfaces and through policy-based, secure and extensible network interfaces. In one embodiment, the network gatekeeper can include a service level agreement (SLA) based policy enforcement engine, which can enforce third-party partner SLA policies at runtime. It can also enable network operators to dynamically customize partner SLA data and access rules to fit traffic prioritization models and the capacity of each individual network node.

Additionally, the network gatekeeper can provide rich traffic management and shaping features, as described throughout the present disclosure. This can allow operators to create deterministic traffic management solutions, distribute traffic internally throughout the network and increase the availability and reliability of services.

The network gatekeeper can be deployed on the telecom operator network in multiple tiers of deployment—a stateless access tier and a stateful network tier. In one embodiment, the two tiers implement a firewall in between them for greater security. The stateless access tier can serve as an entry point for external (possibly un-trusted) third party applications into the network. The network tier which integrates with the internal network can be shielded from the applications by the access tier.

In various embodiments, the pluggable state management architecture can be implemented within the network tier of deployment. A request can arrive at the access tier of the network gateway from an application, at which point it is routed to the plug-in in the network tier. The plug-in within the network tier can receive the request from the access tier and can perform the plug-in processing of the request. In one embodiment, the plug-in generates an object that represents the state of the request. This can be a serializable Java® object that contains the state information. The plug-in can then use the StoreFactory application programming interface (API) by invoking the "getStore" method passing in the class of the object and key/value which serve as an identifier for the store. Alternatively, the store can be identified by a unique string or by other means known in the art.

In one embodiment, the entry point can be a store factory router class within the network tier. This router class can parse the configuration file and determine the storage provider to use based on the provider mappings specified therein. If the configuration file does not specify any provider mappings, a default mapping can be used in the gateway. Once the storage provider is selected, an implementation of the store is returned to the plug-in and the plug-in can create, read, update and delete (CRUD) data from that store implementation.

In addition, a set of queries can be supported by the framework. For example, the store can have support for a store query interface. The behavior of these queries can be configured as part of the storage service configuration files.

The store API can also have support for optionally registering store listeners. In one embodiment, the store listeners can optionally get notified of store content changes. In one embodiment, the store listener can get notified by a subset of change types, such as if the storage provider automatically removes the store entries based on configuration parameters.

Cluster wide locking can also be done using the store interface. This could be used if the same entry in a store may be modified on multiple servers at the same time, in order to avoid getting errors due to concurrent modification. In one embodiment, how locking is done will depend on the storage provider used.

The figures described below illustrate the pluggable state management architecture and the service access gateway within various contexts. It should be noted, however, that the components illustrated in the figures are not intended to limit the scope of these embodiments and are provided purely for purposes of illustration and explanation.

FIG. 1 is an illustration of a network gatekeeper that can be used in conjunction with the pluggable state management architecture in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

The network gatekeeper 104 provides a policy-driven telecommunications Web services gateway that allows granular control over access to network resources from un-trusted domains. This service gateway application can be deployed by a telecom provider in order to manage access to its internal network and its subscribers by external third party service provider applications.

As illustrated by way of example, an embodiment of a network gatekeeper layer 210 provides an easy to use, integrated, configuration-driven intermediary between service providers 134, third party service providers 138 and end users 136. The communications platform of a typical telecom organization can comprise an application layer 200 with interfaces to applications of the service providers 134 and third party service providers 138 and a network layer 220 to interface with the end users 136 via one or more network resource elements 221. The communications platform can further comprise a gatekeeper layer 210 interposed between the application layer 200 and the network layer 220 for managing and controlling information flowing between layers 200 and 220.

At the application layer 200, third party service providers 138 and service providers 134 are provided protocol adapters 206-209 to make services 201-203 available to callers over a network via the gatekeeper layer 210 provided by the communications platform 100. Access to network resource elements 221 by services 201, 202, 203 may be achieved using one or more web services protocol adapters 206-209. The protocol adapters 206-209 provide an interface mechanism, enabling the network gatekeeper 104 to intercept protocol communications from services 201-203 and control access to network resource elements by the services 201-203 in accordance with one or more policies. While illustrated here with reference to an embodiment having adapters to specific protocols, including without limitation, a Short Message Peer-to-Peer protocol (SMPP) protocol adapter 206, a Push Application Protocol (PAP) protocol adapter 207, a Multimedia Messaging Services (MM7) protocol adapter 208 and an Internet Message Access Protocol (IMAP) protocol adapter 209, embodiments may include any number or kind of protocols and are neither limited to, nor required to possess, these illustrated protocol adapters.

The gatekeeper layer 210 includes a gatekeeper 104 that comprises a plurality of functional elements working in concert to control access to network resource elements 221 at the network layer 220 by services 201-203 according to one or more policies. In an embodiment, a service level agreement (SLA) 214 comprises one or more policies governing access to the network layer 220. A policy engine 103 provides enforcement of the service level agreements. Service level agreements specify, e.g., how many messages a service provider sends per hour, and if over a contract limit, the service provider may start paying additional licensing to the telecom provider. In one embodiment, capabilities to create, customize, and execute service level agreement provisions as policies are provided. A charging mechanism 215 determines charges to callers for making a call using network resource elements 221, e.g., determine charges for network traffic (i.e., calls) according to charging information payment amount/schedule, priorities, and the like. Charging mechanism 215 may access data including Call Data Records (CDR) and/or Event Data Records (EDR) in order to determine charges. In one embodiment, the charging mechanism 215 determines an allocation of charges to be apportioned to the third party providing the service. As shown by the dotted lines in FIG. 1, the actions of the policy engine 103 and other functional elements of the gatekeeper 104 provide virtual isolation layers 212a, 212b between services 201-203 at the application layer 200 and network resource elements 221 at the network layer 220. The isolation layers 212a, 212b indicate that the gatekeeper layer 210 functional elements can be isolated from, and unaffected by, the particulars of protocols, interfaces and the like used by applications, services and callers communicating using the network via the gatekeeper 104.

The gatekeeper layer 210 may include one or more resource interfaces 211 to interface with legacy protocols 216-218 or other web services protocols 219 as a mechanism to reach callers and end user applications (clients) via the network layer 220. While illustrated here with reference having resource interfaces to specific protocols, including without limitation, an SMPP protocol adapter 216, a PAP protocol adapter 217, an MM7 protocol adapter 218 and an IMAP protocol adapter 219, embodiments may include any number or kind of protocols and are neither limited to, nor required to possess, these illustrated resource interfaces. An extension toolkit (not shown) enables partners to develop resource interfaces for other protocols to include into the gatekeeper layer 210.

Network layer 220 includes one or more resource elements 221 such as without limitation a Parlay (protocol) gateway 222, an IMS (IP multi-media subsystem), an SMSCs (short-message-service-center) 224 and MMSCs (multi-media messaging service center) 225, each of which provides a mechanism for moving information through the network to one or more end user services 136.

Tools for interacting with Web Services, such as a Web Service—Universal Description Discovery Interface (WS/UDDI), a Web Service—Business Process Execution Language (WS/BPEL) may also be coupled to the network gatekeeper 104 in various embodiments. A log/trace and database can assist with troubleshooting. In some deployments, the network gatekeeper can interface with processes that monitor underlying network function, such as Operations Support Systems/Business Support Systems (OSS/BSS) system via RA protocol adapters. (RA protocol is a protocol for submission of billing information that are maintained in the network gatekeeper 104 and sent to a carrier's existing billing infrastructure.) Embodiments can include one or more of the following services OSS/BSS services. For example and without limitation, Operations Support Systems services can include activation, service assurance, usage/metering and provisioning, including designing, assigning and inventory. Business Support Systems can include billing, including invoicing, rating, taxation, and collections, customer management, including order entry, customer self services, customer care, trouble ticketing, and customer relationship management. Such interfaces can provide access to Operation, Administration, and Maintenance (OAM) applications and others. A policy engine can control access by one or more third party services and services to resource elements in a network layer.

Figure 2:
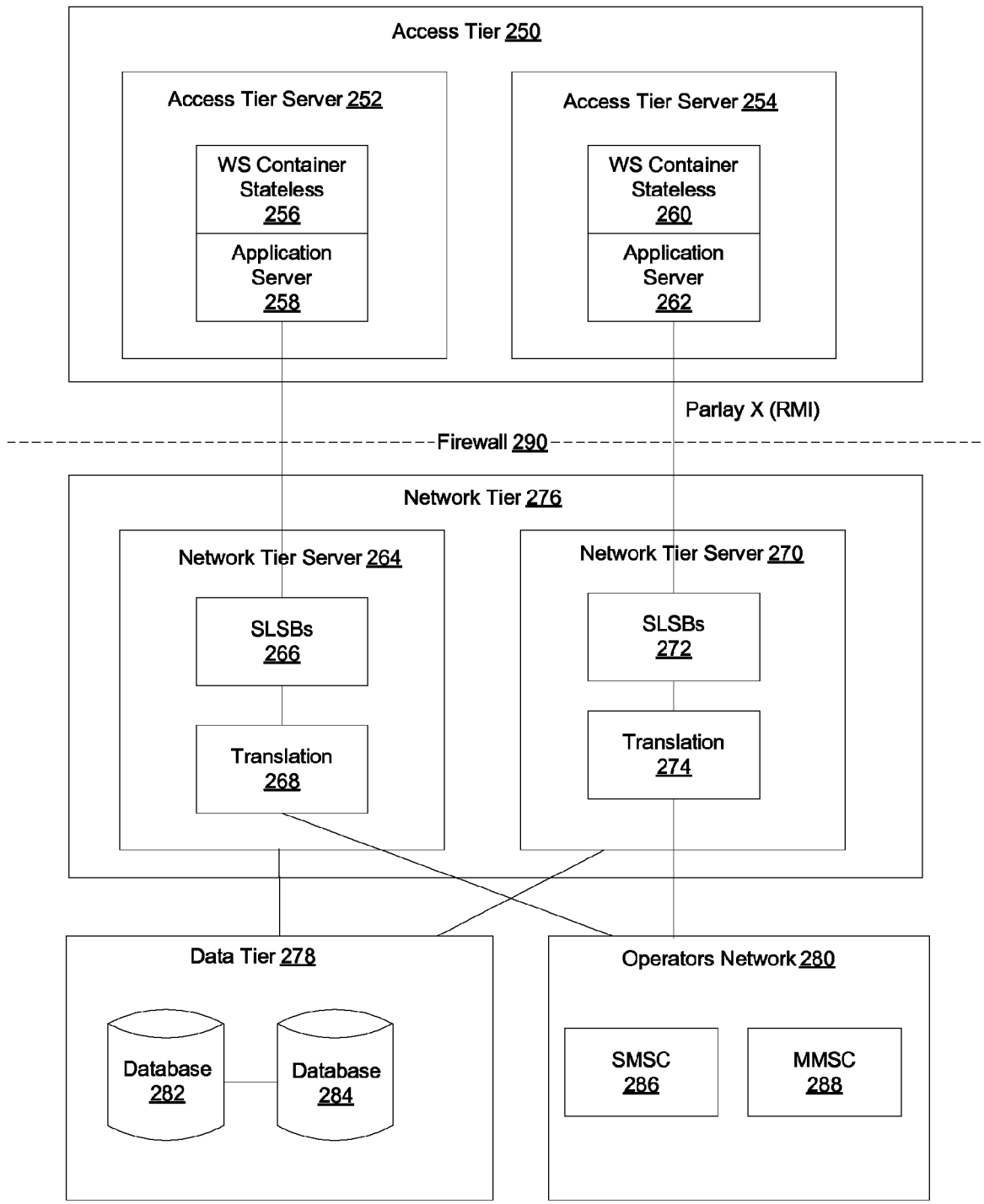
FIG. 2 is an illustration of the network gatekeeper deployment within a telecommunications network, in accordance with various embodiments.

FIG. 2 is an illustration of a possible network gatekeeper deployment within a telecommunications network, in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

It should also be noted that the deployment illustrated in this figure is only one of many possible deployments and that this particular deployment should not be construed to limit the pluggable state management architecture defined in the claims. As will be apparent to one of ordinary skill in the art, the pluggable state management architecture can be implemented with any telecommunication service execution environment and/or deployment, well within the scope of the embodiments described herein.

As illustrated in FIG. 2, the network gatekeeper can be deployed in two tiers—an access layer cluster and a network layer cluster having a firewall 290 in between. The access tier 250 is the entry point for third party applications into the operator's network. The purpose of the access tier is to provide a first level of protection from malicious applications and other potential threats against the integrity of the operator's network. In one embodiment, the access tier can be distributed across multiple access tier servers 252, 254 having an application server software 258, 262 deployed thereon. The web services stateless container 256, 260 can be implemented on top of the application server, allowing the access tier to receive requests into the access tier.

The network tier 276, which integrates with the operator's network, is shielded from applications by the access tier 250. The communications between the access tier and the network tier can be over the Parlay X Web Services as remote method invocations (RMI). The network tier can be comprised of multiple network tier servers 264, 270. In one embodiment, stateless session beans (SLSBs) 266, 272 can be deployed on the network tier servers. In addition, the network tier can include the translation logic components 268, 274, for translating the communications into specific network protocols, as previously described. In various embodiments each tier (access tier and network tier) can be scaled individually by adding new servers. In one embodiment, each server in each tier is running in an active mode.

The deployment can additionally include a data tier 278 with databases 282, 284 or some other forms of persistent storage. Furthermore, the operator's network 280 typically provides a short messaging service center (SMSC) 286 and a multimedia messaging service center (MMSC) 288 to the various subscribers. The SMS center 286 and the MMS center 288 are responsible for handling the SMS operations and the MMS operations (respectively) of a wireless network. For example, when an SMS message is transmitted by a mobile phone, it reaches the SMS center 288, which can then forward the message to the recipient. In various embodiments, the main duties of the SMSC and the MMSC are to route various messages and to regulate the process.

Figure 3:
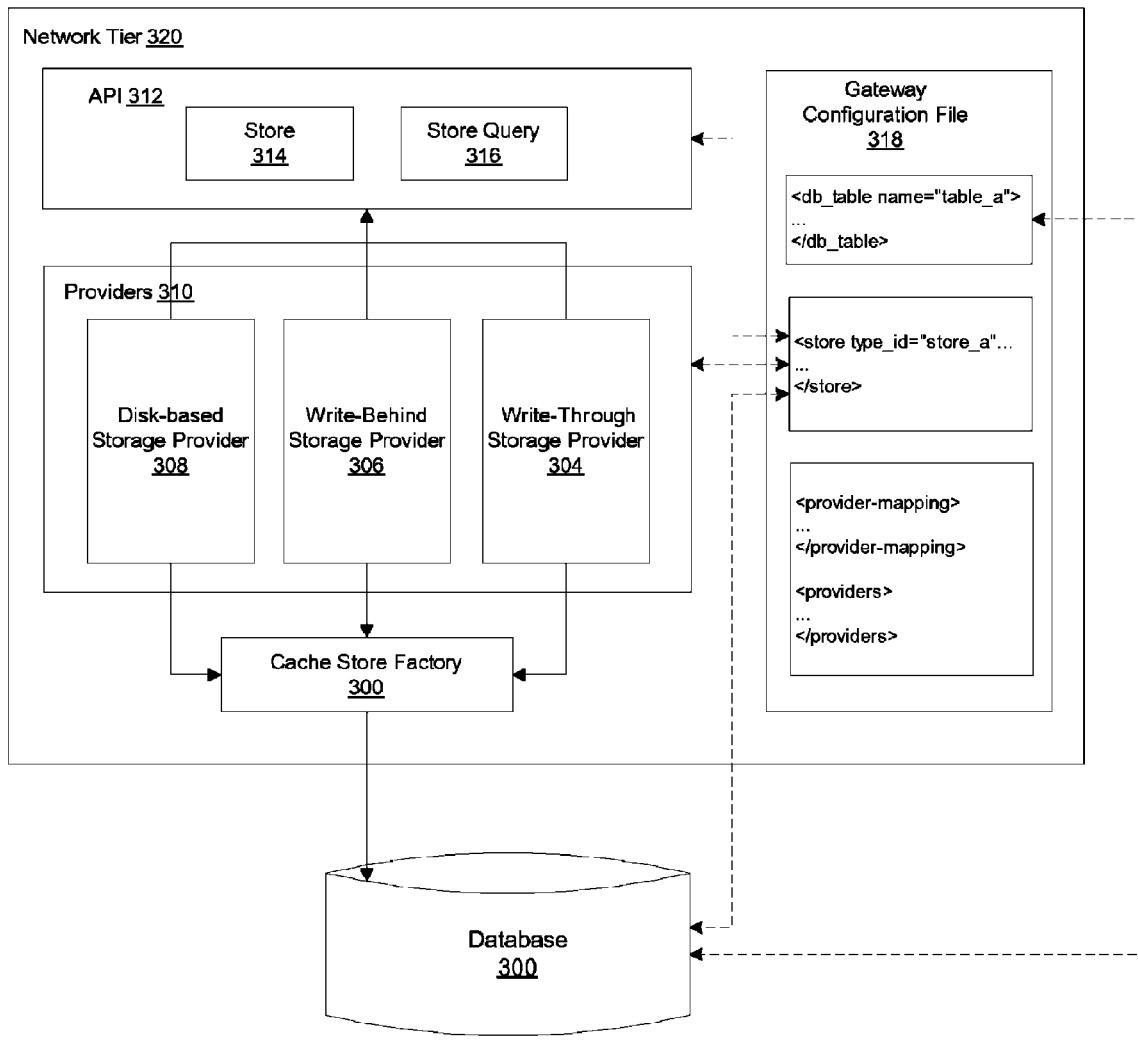
FIG. 3 is an illustration of the pluggable state management architecture within the network tier of the service access gateway, in accordance with various embodiments.

FIG. 3 is an illustration of the pluggable state management architecture within the network tier of the service access gateway, in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the network tier 320 of the gateway can include the API 312 (including a store API 314 and the store query API 316), and a set of storage providers 310. As previously mentioned, the storage service is designed to be pluggable framework to support multiple storage providers 310 for different use cases. The illustration shown here includes three storage providers, namely the database storage provider 308, the write-behind storage provider 306 and the write-through storage provider 304. However, in alternative embodiments, the gateway may implement fewer or more providers, or a different set of providers. In various embodiments, each storage provider implements the store APIs but their implementation may differ. Moreover, each storage provider 304, 306, 308 has its own specificity in terms of performance and use cases.

In one embodiment, the database storage provider 308 reads and writes to a database table and accordingly, it has similar performance to the execution of Java Database Connectivity (JDBC) queries. One benefit of using this storage provider compared to using JDBC, is that it can use the abstracted storage APIs, making it possible to switch the storage provider using configuration to use the caching provider that gives better performance. A typical use case for this type of provider can be where extremely high durability is required, but where performance requirements are not of priority. Another use case can be inserting batches of database table records using the putAll method (e.g. buffered logging to a database table).

The write-behind storage provider 306 can be a cluster-wide in memory cache, preferably with redundancy support by keeping backup copies on one or more of the other servers in the cluster, and also backed by a disk-based store such as a database. Updates for the write behind store are delayed and asynchronously written in batches to the disk-based store. This store has similar performance characteristics as the cluster cache store for data that is available in the cache, but with better availability because it is written to the disk-based store. A possible use case for this provider can be data which is written, read and removed very fast most of the time, but which sometimes needs to be persisted for extended periods of time. One example of this type of data is the short messaging traffic path state. During most messaging, this state is written, read and removed very quickly. In some cases, however, the state needs to persist indefinitely, such as when the receiving mobile device is turned off. This is because the message needs to be delivered once the device becomes available. In order to account for this type of data access, the write-behind provider 306 can read/write/remove data to/from memory very quickly. The writes to the disk-based store 300, on the other hand can be delayed and written in batches. In most cases, this means that the state is never actually written to the disk because it is removed from the in-memory cache before the next batch of updates. In the rare cases when the data does need to preserved, the next batch of updates would take care of writing the state to the disk. Other use cases for the write-behind provider are also possible and well within the scope of the present disclosure.

The write-through storage provider 304 is an in-memory cache backed by disk-based storage (e.g. database) acting as the master. In order to maintain a coherent view of the cache in the cluster, the write-through provider 304 can transmit "invalidating" events or perform replication for specific operations.

The write-through store typically has good performance when the most common operation is to read data from the cache. If the data is updated often, performance may suffer because the store will access the disk-based storage for each update. One such use case can be during a subscription for call notifications or applications session information, when state is often read but updated not too often.

Continuing with the illustration, the cache store factory 300 can be used to instantiate a cache store object that persists data that is written to the disk-based storage. The cache store object can be used to load data from the disk-based store into the cache, whenever the state is not contained in the cache.

In various embodiments, a gateway configuration file 318 can be provided to specify different settings for the service access gateway. The configuration file can be defined using extensible markup language (XML) format and use a document type definition. In one embodiment, the configuration file includes several elements:
  a. Store—configure each store with its various settings. 0-n occurrences.
  b. Database table—configure the database table schema. 0-n occurrences.
  c. Provider mapping—configure the mapping between each store and a specific store provider and store providers (e.g. write-through, database, etc.). 1 occurrence of each element (provider mapping and providers).
  d. A query element—configure named queries to use with stores.

The store type configuration can be done in the store element of the configuration file by specifying a store type_id value that is matched by a wildcard pattern. Whether the different store types are actually managed differently depends on the storage provider used. In one embodiment, for each store that is used, a store element is specified. The store element can specify the following configuration:
  a. Type ID which will be used by the provider mapping and also to define the store type.
  b. Database table if the store is backed by a database. This table refers to a database table element defined in the configuration file.
  c. Store identifier—can be specified by name and key/value class or by key/value class name.

In one embodiment, stores that are backed by the database require a database table element to specify the database mapping configuration. The database table element can specify the following settings:
  a. Table name
  b. Key column name and type
  c. Value column(s) name and type (either bucket column containing entire value optionally in combination with 0-n value columns storing values from get methods of the value object, or only value columns for get methods).
  d. Optional store name column that can be used to separate store views for the same database table.

In various embodiments, the storage service provides several storage providers and it relies on the configuration file 318 to map each store type identifier to a particular storage provider. In one embodiment, by default, the log store type id will map to the database storage provider and all other types can be mapped to the write-through storage provider. The mapping need not depend on the ordering in the configuration file, it can be sorted by closest match first. The mapping can be defined in two elements of the configuration file:
  a. Provider-mapping—this element defines the mapping between the store type id and the provider name. The type id of the store can be specified using a wildcard character such as * which means that the remaining of the id can be any string.
  b. Providers—this element defines the various provider names and their associated store factory class name.

When there is a need to find entries in a store on an attribute of the value object rather than the key, a Store Query can be used. This can also be specified in the configuration file 318. One implementation of this is that the user can add a configuration in the configuration file, specifying how the query is done. How the query configuration is used to execute queries can be storage provider specific. In one embodiment, there are three options to the query configuration:
  a. Cache query only—if the user can be sure that all data is loaded into the cache for a database backed store, or if the store is an in-memory only store type (in which case there is no backing store, and thus the cache is the entire data set) and the storage provider supports this. In this case, the query can be configured to have a filter class only. The user would specify a class that implements the filter interface and implement the evaluation of store value objects to find entries that match the query. The specified filter class can be invoked with the ordered parameters specified for the store query by the user, to enable the filter implementation to filter the query results properly.
  b. SQL query only—if the user has a database backed store and only wants to match queries on the database table rather than the cached data. The SQL query specified in the configuration file can be used as a JDBC prepared statement, and the parameters set on the store query by the user will be used with setParameter in the order specified for the store query.
  c. Both Cache query and SQL query—if the store is a database backed store and the user wants to optimize using a cache query if the cache is complete, and SQL if some data is missing in the cache. If the storage provider supports this, it will take a decision based on the cache and database table sizes if cache query or SQL query should be used, and execute the query chosen.

Figure 4:
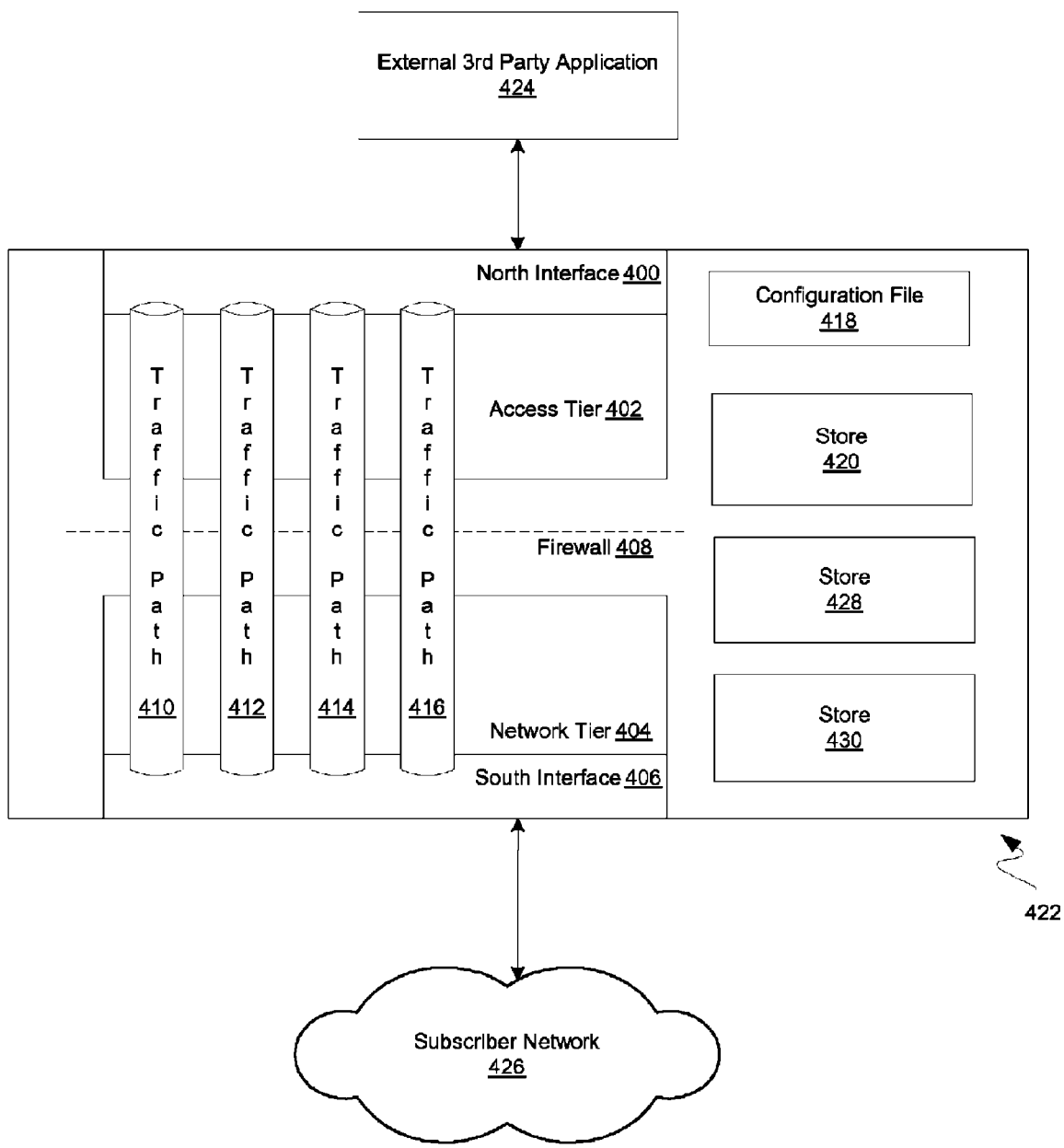
FIG. 4 is an illustration of the pluggable state management architecture within the service access gateway, in accordance with various embodiments.

FIG. 4 is an illustration of the pluggable state management architecture within the service access gateway, in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the network gateway 422 can be deployed by a telecommunications provider in order to manage the interactions between it subscriber network 426 and the third party external service provider applications 424. As an illustration, the external application can provide text voting feature where the subscribers of the telecom provider can text a vote on a specific topic by using their mobile device. Many other such third party applications are possible and the present disclosure should not be limited in any way to any specific type of application.

The service access gateway 422 can be deployed in two tiers, namely the access tier 402 and the network tier 404, which can be further separated by a firewall 408. The gateway can also include one or more traffic paths 410, 412, 414, 416 between the application and the various subscriber devices. The traffic path can be a basic functional unit of the network gatekeeper. In one embodiment, the traffic path is comprised of a service type (Short Messaging, User Location, etc.), an application-facing "north" interface 400, and a network-facing "south" interface 406. A request for service enters through one interface, is subjected to internal processing, including evaluation for policy and protocol translation, and is then forwarded using the other interface. In various embodiments, some examples of traffic paths 410, 412, 414, 416 include:

- a. Third Party Call—Using this traffic path, an application can set up a call between two parties (the caller and the callee), poll for the status of the call, and end the call.
- b. Audio Call—Using this traffic path, an application can set up a call to a telephone subscriber and then, when the subscriber answers, play an audio message, such as a meeting reminder.
- c. Call Notification—Using this traffic path, an application can set up and end notifications on call events, such as the callee in a third party call attempt is busy. In addition, in some cases the application can then reroute the call to another party.
- d. Call Handling—Using this traffic path, an application can establish rules that will automatically handle calls that meet certain criteria. These rules might establish, for example, that calls from a particular number are always blocked, or are always forwarded if the initial callee is busy. In addition, the application can retrieve rules that are currently in place.
- e. Short Messaging—Using this traffic path, an application can send SMS text messages, ring tones, or logos to one or multiple addresses, set up and receive notifications for final delivery receipts of those sent items, and arrange to receive SMSes meeting particular criteria from the network.
- f. Multimedia Messaging—Using this traffic path, an application can send Multimedia Messages to one or multiple addresses, set up and receive notifications for final delivery receipts of those sent items, and arrange to receive MMSes meeting particular criteria from the network.
- g. Terminal Status—Using this traffic path, an application can request the status (reachable, unreachable, or busy) of one or more terminals and set up and receive notifications for a change in status for particular terminals.
- h. Terminal Location—Using this traffic path, an application can request the position of one or more terminals or the distance between a given position and a terminal. It can also set up and receive notifications based on geographic location or time intervals.
- i. Presence—Using this traffic path, an application can be a watcher for presence information published by a presentity, an end user who has agreed to have certain data, such as current activity, available communication means, and contact addresses made available to others. So a presentity might say that at this moment he is in the office and prefers to be contacted by SMS at this number. Before the watcher can receive this information, it would subscribe and be approved by the presentity. Once this is done, the watcher can either poll for specific presentity information, or set up status notifications based on a wide range of criteria published by the presentity.
- j. Payment—Using this traffic path, an application can communicate charging information to an operator in situations where the cost of the service is based on the nature of the content delivered and not on connect time. For example, an end user could request the download of a music video, which costs a specific amount. The application can notify the operator that the user should be charged a particular amount or be refunded a particular amount. In the case of pre-paid accounts, it can also reserve a certain amount of the user's available funds and then charge or release the reservation depending, say, on whether or not the download was successful.
- k. WAP Push—Using this traffic path, an application can send a wireless application protocol (WAP) Push message, send a replacement WAP Push message, or set up status notifications about previously sent messages.

As illustrated, the service access gateway can also include multiple types of stores 420, 428, 430 and a configuration file 418. The configuration file can specify which type of store should be used to store data for each specific traffic path. Accordingly, once a request is received to the gateway, the gateway can determine the traffic path that is being accessed and depending on that traffic path type, it can select a storage provider to be used in handling the request. Because the traffic paths differ in terms of their data access requirements, the ability to implement the pluggable state management architecture in this manner allows the gateway to process traffic more efficiently and with less latency than would otherwise be possible.

Figure 5:
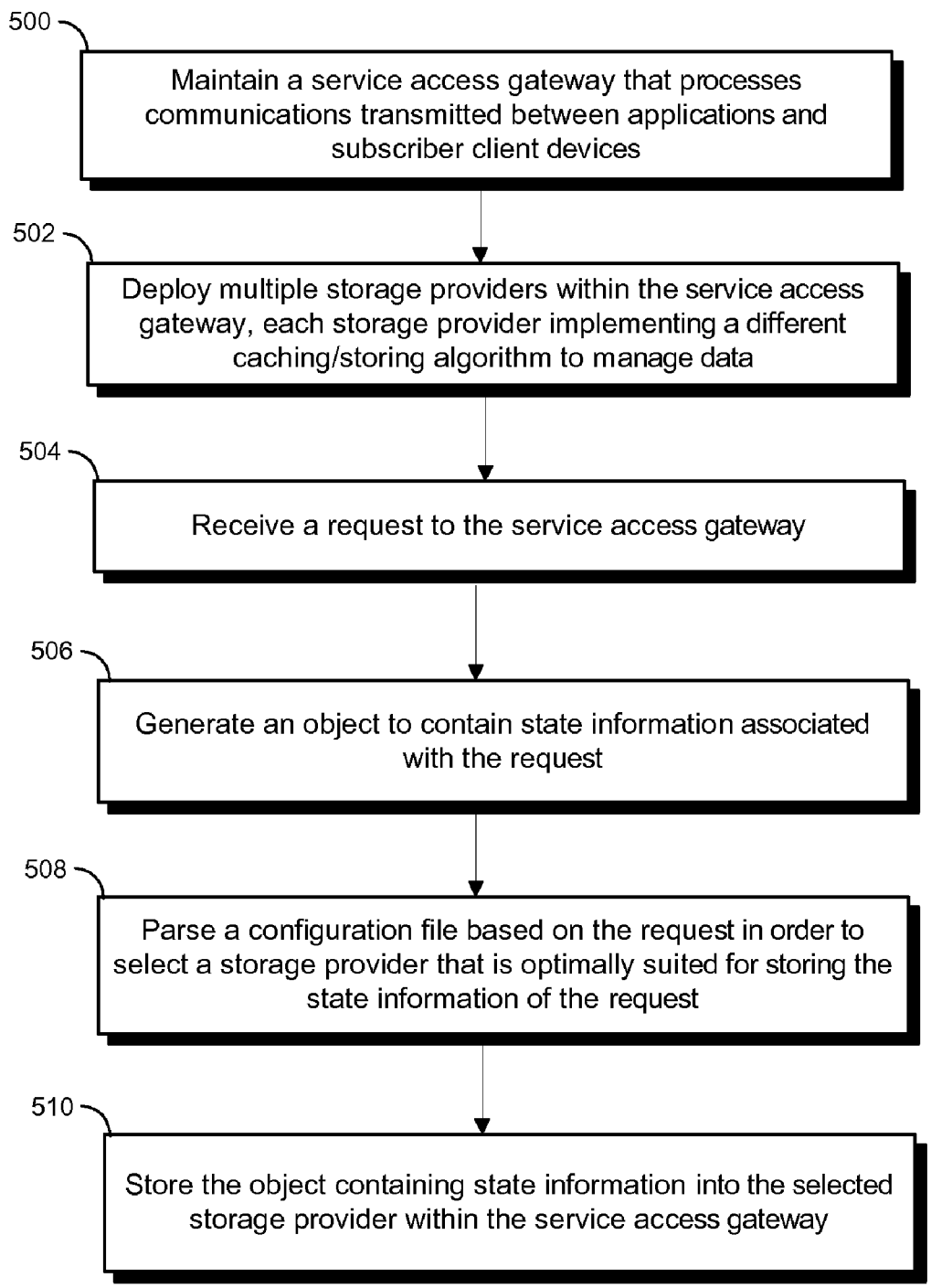
FIG. 5 is an exemplary flow chart diagram of the process for providing a pluggable architecture of multiple state storage types, in accordance with various embodiments.

FIG. 5 is an exemplary flow chart diagram of the process for providing a pluggable architecture of multiple state store types, in accordance with various embodiments. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

As shown in step 500, the process can generally encompass maintaining a telecommunications gateway by a telecom provider. In one embodiment, the gateway is a service access gateway that processes communications transmitted between external third party applications and subscriber client devices of the internal telecom provider network. As shown in step 502, a set of multiple storage providers can be deployed within the gateway, where each storage provider implements a different caching/storing algorithm to manage data. For example, one storage provider can be a cluster wide in-memory only cache. Another storage provider can be a disk-based log storage provider which updates the data directly to the disk-based store by delaying and asynchronously writing in batches. Another store can be a write behind disk-based storage provider that provides an in-memory cache backed by disk storage where the updates to the disk are delayed and asynchronously written in batches. Another example of a storage provider can be a write through disk-based store which provides an in-memory cache as well as updates to the disk which are done synchronously as part of the store update operation. Various other storage providers can also be implemented, as known in the art.

Continuing with the illustration, in step 504, a request is received to the service access gateway. Requests can be received from the external application, from a subscriber client, or from some intermediate entity such as an SMSC. During the normal functioning of the gateway, such requests are processed, translated and forwarded to the intended recipients. In various embodiments, during the processing of the request, the gateway generates an object to contain state information associated with the request, as shown in step 506. In one embodiment, this object is a serializable Java® object that will be used to store data. In other embodiments, other such implementations of data containing objects are possible. As shown in step 508, the gateway can parse a configuration file based on the request in order to select a storage provider that is optimally suited for storing the state information of the request. This can be done according to the data access requirements of the traffic path intended for the request. For example, if the request is associated with the traffic path that requires read-mostly type of access for long lived data, a write-through provider can be selected to manage the state of the request. On the other hand, if the request traffic path performs mostly write operations of long-lived data, the write-behind storage provider should be selected.

In step 510, once the appropriate storage provider is selected for the request, the gateway can store the object containing state information into the selected storage provider. Alternatively, the storage provider can be used to read, update or delete the state information for the request. Once processing is complete within the gateway, the request can be forwarded to the intended recipient.

In various aspects, the embodiments previously described encompass computer apparatus, computing systems and machine-readable media configured to carry out the foregoing methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of rotating media including floppy disks, optical discs, DVD, CD-ROMs, microdrive, and magneto-optical disks, and magnetic or optical cards, nanosystems (including molecular memory ICs), or any type of media or device suitable for storing instructions and/or data.

Stored on any one of the machine readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, virtual machines and user applications.

Included in the programming (software) of the general/specialized computer or microprocessor are software modules for implementing the teachings of the present invention, including, but not limited to providing mechanisms and methods for providing pluggable state storage types, as discussed herein.

Various embodiments can be (by way of example and without limitation) used in conjunction with services such as:

VoIP services, including, without limitation the following features:
  Basic features. These include standards services such as Voice mail, Caller ID, Call waiting, and call forwarding (the ability to forward a call to a different number).
  Advanced features:
  Call logs: The ability to view calls made over a given period of time online, ability to associate names with phone numbers, integrate call log information to other applications such as instant messaging (IM).
  Do not disturb: The ability to specify policies around receiving calls—for example, all calls during office hours to be automatically forwarded to a mobile terminal, all calls during the night to be directed to voice mail etc.
  Locate me: This is advanced call forwarding. Rather than have all calls forwarded to a single location (e.g., voice mail) when the caller is busy, Locate me can try multiple terminals in series or in parallel. For example, a user may have two office locations, a mobile, and a pager, and it may make sense to forward a call to both office locations first, then the pager, and then the mobile terminal. Locate me is another example of feature interaction.
  Personal conferencing: A user could use an existing application (e.g., IM client) to schedule a Web/audio conference to start at a certain time. Since the IM client already has personal profile information, the conferencing system sends out the Web conference link information either through IM and/or email to the participants. The phone contact information in the profile is used to automatically ring the participants at the time of the conference.
  Lifetime number: This is the facility where a single virtual number can travel with a customer wherever they live. Even if they move, the old number continues to work, and reaches them at their new location. This is really the analog of static IP addresses in a phone network.
  Speed dial: This is the ability to dramatically expand the list of numbers that can be dialed through short-key and accelerator combinations. This is another example of a converged application, since it's very likely that when a user sets up this information when they work through the call logs on the operator user portal, the updated information will need to be propagated to the network side in real-time.

Media delivery services, including, without limitation the following features:
  Depending on the service level agreement users are willing to sign up to, the quality of media delivered (e.g. # of frames per second) will vary. The policy engine enables segmenting the customer base by revenue potential, and to maximize return on investment made in the network.

Context-sensitive applications including, without limitation the following features:

A typical example here is the need for applications that have a short lifetime, extremely high usage peaks within their lifetime, and immediacy. For example, voting on American Idol during the show or immediately afterwards has proved to be an extremely popular application.

Integrated applications including, without limitation the following features:

This class of applications is one that combines wireline and wireless terminal usage scenarios. An example of an integrated application is the following: a mobile terminal user is on a conference call on his way to work. When he reaches his office, he enters a special key sequence to transfer the phone call to his office phone. The transfer happens automatically without the user having to dial in the dial-in information again. It's important to note hear that this capability be available without the use of any specific support from the hand-set (a transfer button for example).

As used herein, the term application broadly includes any data entry, update, query or program that processes data on behalf of a user. Users may be human or computational entities. The term external application or third party application are used interchangeably and are intended to be broadly construed to mean any applications which reside outside of the gateway of the telecommunications provider and which provide a particular service to the subscribers of the provider. The term gateway is to be interpreted broadly to mean any software application or hardware that serves as an intermediary entity for processing requests between two or more other entities. The term subscriber device is intended to be broadly construed to be any mobile or other hardware devices that are connected to the gateway, including but not limited to cellular telephones, personal digital assistants (PDAs), laptops and personal computers.

As used herein, the term web services protocol is defined as a communications protocol that can be used for providing services between two or more applications over a network. Typical web services protocols include without limitation Push Application Protocol (PAP) protocol, Multimedia Messaging Services (MM7) protocol and the like. As used herein, the term legacy protocol is defined as a communications protocol implemented by existing applications or telecommunications systems. As used herein, the term policy is defined as a computational object including information for enforcing a limitation, a decision or otherwise causing a control point to take some action or refrain from taking some action to shape traffic.

As previously mentioned, the various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. In various embodiments, the transmission may include a plurality of separate transmissions.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

The invention claimed is:

1. A method for providing a pluggable architecture of multiple state storage types within a telecommunications service access gateway, said method comprising:
   maintaining a computing device including a service access gateway that processes communications transmitted between applications and subscriber client devices;
   deploying multiple storage providers within the service access gateway, each storage provider implementing a different state management algorithm to manage data and to store said data in physical memory of said computing device;
   receiving a request to the service access gateway;
   generating an object to contain state information associated with said request;
   parsing a configuration file based on the request in order to select a storage provider that is optimally suited for storing the state information of the request; and
   storing the object containing state information into the selected storage provider within the service access gateway.

2. The method of claim 1 wherein deploying multiple storage providers within the service access gateway further includes:
   deploying an in-memory cluster cache store, a write-behind disk-based store, a write-through disk-based store and a disk-based log store within the service access gateway.

3. The method of claim 1 wherein maintaining the service access gateway further includes:
   maintaining at least one traffic path that receives the request at the service access gateway, processes said request and routes the request to a recipient, wherein the storage provider is selected according to a set of data requirements of said traffic path.

4. The method of claim 1 wherein the service access gateway further includes:
   a stateless access tier that is an entry point for requests received from external applications to the service access gateway;
   a stateful network tier that performs translation of said requests into one or more network specific protocols of the subscriber network; and
   a firewall between the access tier and the network tier.

5. The method of claim 1 wherein the selection of the storage provider is based on one or more of: a type of said data that is stored, how often the data is written and read, and how long the data will stay in the storage provider.

6. The method of claim 1 wherein selecting a storage provider further includes:

determining a trade-off between data integrity provided by transaction synchronized write-through operations and performance provided by an asynchronous write-behind operation.

7. The method of claim 1 wherein the request is received from an external third party application to the service access gateway, said request being forwarded to a mobile subscriber device.

8. The method of claim 1 wherein the request is received from a mobile subscriber device to the service access gateway, said request being forwarded to an external third party application.

9. The method of claim 1 wherein the configuration file further includes at least one of: a store element, a database table element, a provider-mapping element and a query element.

10. The method of claim 1 wherein one or more queries are executed against the storage provider.

11. A system including physical memory storing a set of instructions and one or more processors that process said instructions to provide a telecommunication service access gateway, said gateway comprising:
    at least one traffic path having an application facing interface and a network facing interface, said traffic path used to receive a request at the gateway, process said request and route the request to a recipient;
    a plurality of storage providers that store state information for requests being processed in the gateway, wherein the gateway receives the request, determines the traffic path associated with said request, selects at least one of the storage providers according to said traffic path and persists data into the selected storage provider; and
    a configuration file that is parsed in order to select a storage provider optimally suited for storing the state information associated with the traffic path.

12. The system of claim 11, wherein the gateway further comprises:
    a stateless access tier that is an entry point for requests received from external applications to the service access gateway;
    a stateful network tier that performs translation of said requests into one or more network specific protocols of the subscriber network; and
    a firewall between the access tier and the network tier.

13. The system of claim 11, wherein the plurality of storage providers further include:
    an in-memory cluster cache store;
    a write-behind disk-based store;
    a write-through disk-based store; and
    a disk-based log store.

14. The system of claim 11, wherein the selection of the storage provider is based on one or more of: a type of said data that is stored, how often the data is written and read, and how long the data will stay in the storage provider.

15. The system of claim 11, wherein selecting a storage provider further includes:
    determining a trade-off between data integrity provided by transaction synchronized write-through operations and performance provided by an asynchronous write-behind operation.

16. The system of claim 11, wherein the request is received from an external third party application to the service access gateway, said request being forwarded to a mobile subscriber device.

17. The system of claim 11, wherein the request is received from a mobile subscriber device to the service access gateway, said request being forwarded to an external third party application.

18. The system of claim 11, wherein the plurality of storage providers are used to store one or more queries.

19. A non-transitory computer-readable storage medium storing one or more sequences of instructions for providing a pluggable state management architecture within a service access gateway, said instructions, when executed by one or more processors, causing the one or more processors to carry out the steps of:
    maintaining a service access gateway that processes communications transmitted between applications and subscriber client devices;
    deploying multiple storage providers within the service access gateway, each storage provider implementing a different state management algorithm to manage data;
    receiving a request to the service access gateway;
    generating an object to contain state information associated with said request;
    parsing a configuration file based on the request in order to select a storage provider that is optimally suited for storing the state information of the request; and
    storing the object containing state information into the selected storage provider within the service access gateway.

* * * * *